United States Patent [19]

Brown et al.

[11] Patent Number: 4,489,506

[45] Date of Patent: Dec. 25, 1984

[54] MATERIAL TREATMENT

[75] Inventors: Ernest C. Brown, Danvers; Walter E. Buske, Amesbury, both of Mass.; Norman A. Putnam, Bethel, Me.

[73] Assignee: Wolverine Corporation, Methuen, Mass.

[21] Appl. No.: 431,399

[22] Filed: Sep. 30, 1982

[51] Int. Cl.³ .............................................. F26B 9/08
[52] U.S. Cl. ..................................... 34/57 A; 34/218; 99/474
[58] Field of Search ................. 34/57 A, 64, 65, 225, 34/233, 67, 54, 218; 99/281, 286, 287, 288, 468, 470, 474, 479

[56] References Cited

U.S. PATENT DOCUMENTS

| | | | |
|---|---|---|---|
| 2,069,193 | 1/1937 | Behr et al. | 34/9 |
| 2,326,094 | 8/1943 | Cusack et al. | 34/45 |
| 2,327,282 | 8/1943 | McComb | 34/64 |
| 2,497,501 | 2/1950 | Himmel et al. | 99/68 |
| 2,700,225 | 1/1955 | Schmid et al. | 34/45 |
| 3,262,217 | 7/1966 | Brown et al. | 34/57 |
| 3,263,339 | 8/1966 | Brown et al. | 34/57 |
| 3,372,489 | 3/1968 | Brown | 34/57 |
| 3,572,235 | 3/1971 | Nutting et al. | 99/236 |
| 3,662,474 | 5/1972 | Huthwaite | 34/9 |
| 3,849,900 | 11/1974 | Dale et al. | 34/10 |
| 3,964,175 | 6/1976 | Sivetz | 34/57 |
| 4,201,499 | 5/1980 | Buske et al. | 34/57 A |
| 4,271,603 | 6/1981 | Moore | 34/181 |
| 4,322,447 | 3/1982 | Hubbard | 426/467 |
| 4,325,191 | 4/1982 | Kumagai et al. | 34/54 |

FOREIGN PATENT DOCUMENTS

| | | |
|---|---|---|
| 445812 | 9/1970 | Australia . |
| 55462 | 7/1982 | European Pat. Off. . |
| 2039451A | 8/1980 | United Kingdom . |

*Primary Examiner*—Larry I. Schwartz

[57] ABSTRACT

Apparatus for roasting small quantities of coffee (typically less than five pounds) includes a roasting chamber with base and cylindrical wall portions in fixed relation to each other. Disposed coaxially within the chamber is a downwardly extending tube that has an outlet orifice spaced from the base surface, and an exhaust outlet is in the upper portion of the chamber. A stream of hot roasting gas flowed downwardly through the central tube at high velocity for impact on the base surface and deflection radially outwardly and then flow upwardly through the exhaust outlet at the top of the chamber produces a toroidal circulation pattern of fluidized coffee beans with rapid and uniform roasting of the green coffee, in a simple and compact arrangement in which roasting parameters (such as fluid temperature and cycle duration) may be easily adjusted depending on the degree of roast desired.

27 Claims, 8 Drawing Figures

MATERIAL TREATMENT

This invention relates to the treatment of solid particulate materials, and more particularly to the roasting of coffee beans and the like.

It is well known that green coffee beans must be roasted to achieve the flavor, taste, and aroma characteristics that are conventionally associated with freshly brewed coffee, green coffee beans possessing none of those values. Roasting not only develops a desired brown coffee color, but also effects an alteration of natural elements present in the green beans to provide aromatic qualities, and taste and flavor values desired in the coffee beverage. The full development of the desired aroma, flavor and taste values depends on a number of factors, including the type and blend of coffee beans and the temperature and duration of the roasting process.

Industrial coffee roasters are orientated towards processing large quantities of coffee beans. Such roasting systems have employed rotary cylinder arrangements which receive the coffee bean charge and through which hot recirculatory gases are passed; and fluidized bed systems in which the coffee beans progressively move through a roasting zone while being subjected to streams of fluidizing gases to roast the beans. It is well known that while green coffee beans remain fresh almost indefinitely, roasted coffee beans lose their freshness very quickly. For this reason, efforts have been made to develop systems for roasting small quantities of coffee for domestic and retail uses, both to provide freshly roasted coffee and to provide different kinds of roasted coffee.

In accordance with one aspect of the invention there is provided apparatus for roasting small quantities of coffee (typically less than five pounds). The apparatus includes a roasting chamber with base and cylindrical wall portions in fixed relation to each other. Disposed coaxially within the chamber is a downwardly extending tube that has an outlet orifice spaced from the base surface, and an exhaust outlet is in the upper portion of the chamber. A stream of hot roasting gas is flowed downwardly through the central tube at high velocity for impact on the base surface and deflection radially outwardly and then flow upwardly through the exhaust outlet at the top of the chamber. This column of roasting gas produces a toroidal circulation pattern of fluidized coffee beans with rapid and uniform roasting of the green coffee, in a simple and compact arrangement in which roasting parameters (such as fluid temperature and cycle duration) may be easily adjusted depending on the degree of roast desired.

The chamber preferably has a diameter that is about three to six times the diameter of the single central tube, the chamber in a particular embodiment having an inner diameter of about nine inches and the tube having an inner diameter of about two inches. The discharge port of the tube is preferably spaced about one to three times its diameter above the planar surface of the base and in the particular embodiment, that spacing is three inches. In that embodiment, the charge of green coffee beans typically is in the order of one-two pounds, the roasting gas temperature is typically in the range of 480°–600° F. and the roasting cycle duration is in the order of one and one-half to two and one-half minutes depending on the degree of roast desired. In that embodiment, a two pound charge of green coffee beans has a bed depth of about one inch, and when the coffee bean charge is fluidized into the toroidal recirculation pattern it rises to a height of about four inches above the base. Preferably the chamber has a transition between the cylindrical wall and planar base in the form of a smoothly curved continuous surface with a radius of at least about one inch. In a particular roasting process, air at a temperature of about 560° F. and at a supply plenum pressure of about five inches of water roasts a one and one-half pound charge of green coffee beans in about one and one-half minutes. During the roasting, the coffee beans are maintained in the fluidized toroidal recirculation pattern with heating both by conduction and convection. The flowing agitation and thermal processing of the coffee beans produces chaff which is carried off in the exhaust stream.

In accordance with another feature of the invention, there is provided apparatus for roasting coffee beans and the like that comprises a roasting chamber for receiving a charge of coffee beans to be roasted, structure defining a fluid flow path external of the chamber and that interconnects the chamber outlet and inlet ports. Fluid is flowed through the flow path and the roasting chamber for fluidizing a charge of coffee beans in the chamber, and heater means in the flow path heats the circulating fluid to a predetermined coffee bean roasting temperature whereby heat is transferred to the fluidized coffee beans in the chamber by the heated recirculating fluid to roast the coffee beans. Structure defining a chaff collection region is coupled to the flow path between the chamber outlet port and the heater means, and means is coupled to the flow path for introducing dilution fluid to reduce the temperature of the fluid exhausted from the roasting chamber through the exhaust port so that the temperature of the chaff transported from the roasting chamber to the chaff collection region does not reach its autoignition temperature.

In accordance with still another feature, screen structure is disposed in the flow path between the outlet of the roasting chamber and the heater for removing particulate material from the recirculating fluid, a bypass circuit coupled to the flow path provides an auxiliary flow path bypassing the roasting chamber, and the apparatus includes valve structure that is alternately operable between a first mode in which the roasting chamber is connected in the flow path and a second mode in which the auxiliary flow path is connected in the flow path. The valve is placed in its second mode during transfer of a roasted charge of coffee beans from the roasting chamber so that flow of fluid through the heater is maintained during that interval and nozzle structure connected to the auxiliary path flows high velocity streams of fluid in reverse direction through the lint screen structure to dislodge lint from the screen during the interval that the valve is in its second mode.

In a particular embodiment, the roasting chamber depends from a supply plenum and heated air is flowed by a blower through a closed, insulated recirculation path that includes the supply plenum for flow into the roasting chamber in the downwardly directed high velocity column of air that fluidizes the charge of green coffee beans and exhaust upwardly through exhaust ports where the air stream is diluted with ambient air, and then past baffle and screen structures for removal of liberated chaff from the air stream. Associated with the roasting chamber is a cooling region into which the roasted beans are transferred as soon as roasting has been completed. The roasted beans are cooled by a flow of ambient air which is drawn through a cooling circuit and exhausted from the roasting apparatus and passed through a scrubber unit. The heated and cooling air flow paths are interconnected so that a minor fraction of air may be flowed from one path to the other as desired. Other suitable heat exchange fluid such as steam or inert gases may be employed for roasting. Similarly, other suitable cooling means may be employed such as quenching with cool air, water or an air-water mixture. After cooling, the beans may be transferred to a container or flowed directly to a subsequent stage for further processing such as grinding.

Other features and advantages of the invention will be seen as the following description of a particular embodiment progesses, in conjunction with the drawings, in which:

DESCRIPTION OF PARTICULAR EMBODIMENT

Figure 1:
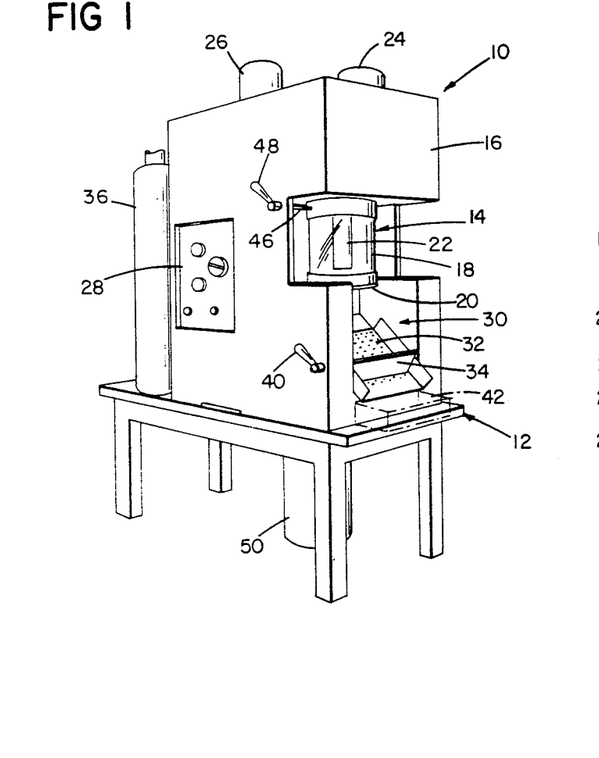
FIG. 1 is a perspective view of a coffee roaster in accordance with the invention.

Shown in FIG. 1 coffee roaster 10 mounted on support 12. Coffee roasting chamber 14 depends from thermally insulated plenum 16 and includes transparent glass cylinder 18 and stainless steel base 20. Tube 22 (two inches in diameter) extends downwardly coaxially within cylinder 18 from plenum 16. A charge of coffee beans to be roasted is delivered to chamber 14 through feedhopper 24. Heated air, propelled by a fan driven by motor 26, flows downwardly from plenum 16 through tube 22 in a high velocity column of air that impacts on pan 20 (creating toroidal recirculation of fluidized coffee beans) and is exhausted upwardly from chamber 14. Parameters of the roasting sequence such as time duration and air temperature are controlled and indicated by devices mounted on control panel 28.

Cooling region 30 is located below roasting chamber 14 and includes perforated support surface 32 and control gate 34. During the cooling sequence, air is drawn in through and over the roasted coffee beans on support 32, down through the support and then exhausted through the rear of the roaster unit 10 to scrubber 36. After the roasted beans have been cooled, gate 34 is operated by control handle 40 to allow the cooled beans to flow from the cooling region 30 directly to a grinding stage (not shown) for further processing or to a container 42 for storage or transport to another location. Handle 48 is coupled to shaft 46 which operates a flow control valve assembly and opens a port in the roasting chamber in coordinated manner to transfer roasted beans to the cooling region 30. Control 40 operates a dump valve to transfer collected chaff to a container 50 located below support 12.

Figure 2:
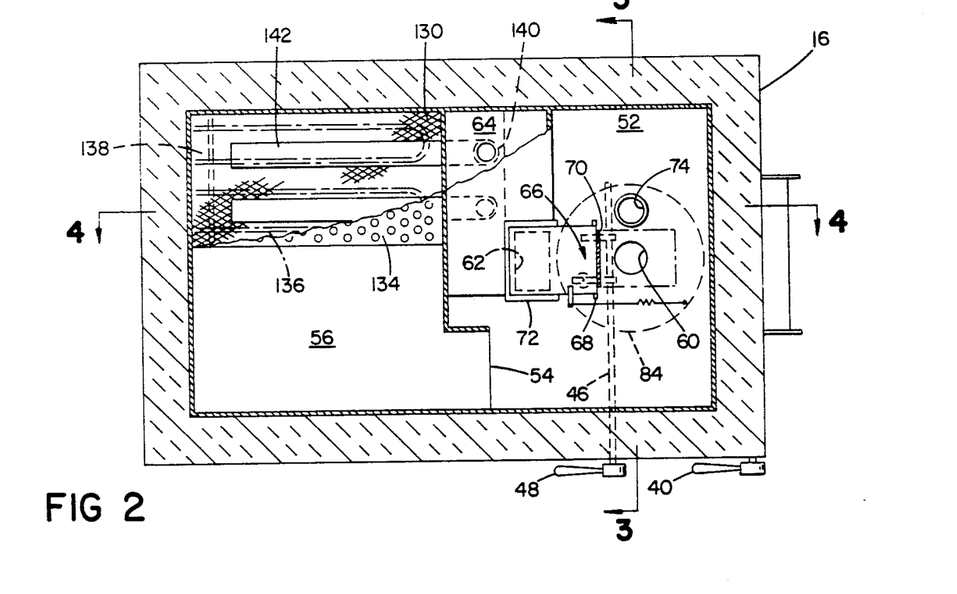
FIG. 2 is a sectional view taken along the line 2—2 of FIG. 3 with parts broken away, showing details of the coffee roaster shown in FIG. 1.
Figure 3:
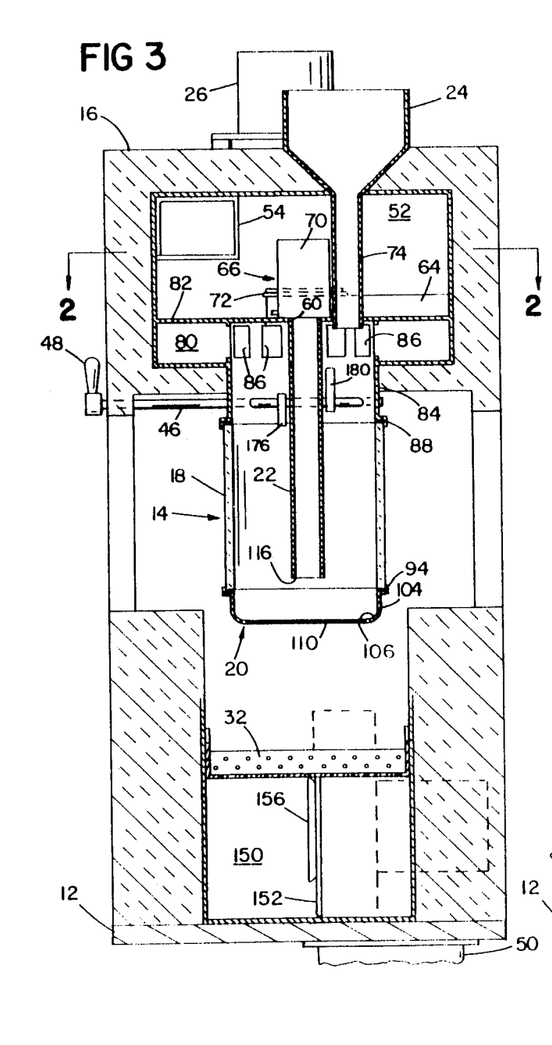
FIGS. 3 and 4 are sectional views taken along the lines 3—3 and 4—4 respectively of FIG. 2.
Figure 4:
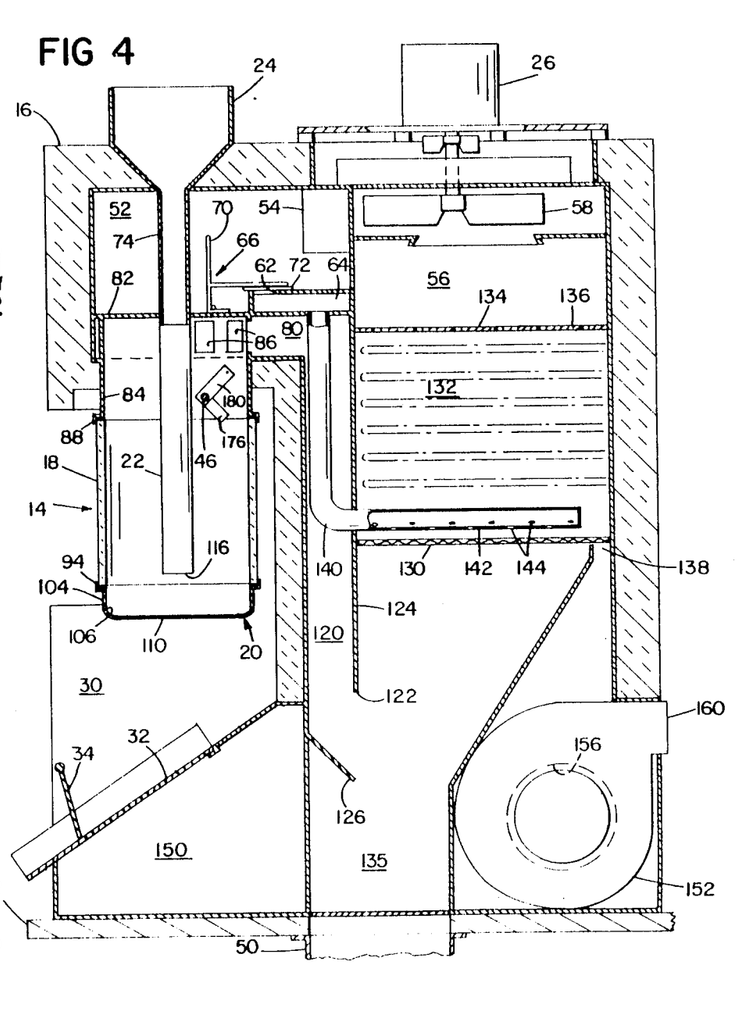

Further aspects of the roaster 10 may be seen with reference to FIGS. 2–4. Plenum unit 16 defines an insulated plenum chamber 52 that has an inlet 54 from fan chamber 56 in which fan wheel 58 is supported for rotation by one half horsepower fan motor 26. In the base of plenum chamber 52 is a first port 60 in direct communication with jet tube 22 and a second port 62 that communicates with bypass chamber 64. Valve assembly 66 is mounted for pivoting movement on shaft 68 and includes valve members 70 and 72, valve member 70 being arranged to close port 60 in one valve position and valve member 72 being arranged to close port 62 in a second (alternate) valve position. An operating mechanism controlled by shaft 46 moves the valve assembly between a first position in which port 60 is open and port 62 is closed (roasting mode) and a second position in which port 60 is closed and port 62 is open (bypass mode). Tube 74 extends through plenum chamber 50 from hopper 24 to a port at the top of roasting chamber 14 and provides a passage for flow of dilution air during roasting.

An exhaust plenum chamber 80 is located immediately below supply plenum 52 with plate 82 separating chambers 52 and 80. Depending from plate 82 is cylindrical stainless steel sleeve 84 that defines the top of roasting chamber 14 and has an array of exhaust ports 86 that provide communication between chamber 14 and exhaust plenum 80. At the base of sleeve 84 is a flange 88 which carries a sealing gasket 90 and receives the upper end of glass cylinder 18. That cylinder has an inner diameter of 9½ inches, a wall thickness of ⅜ inch, and is eight inches in axial length. The lower end of cylinder 18 is seated on seal gasket 92 carried by flange 94 of base assembly 20. Ears 96 that project radially outward from base assembly 20 receive support rods 98 that are secured with fasteners 100, 102 and support the roasting chamber assembly.

Figure 5:
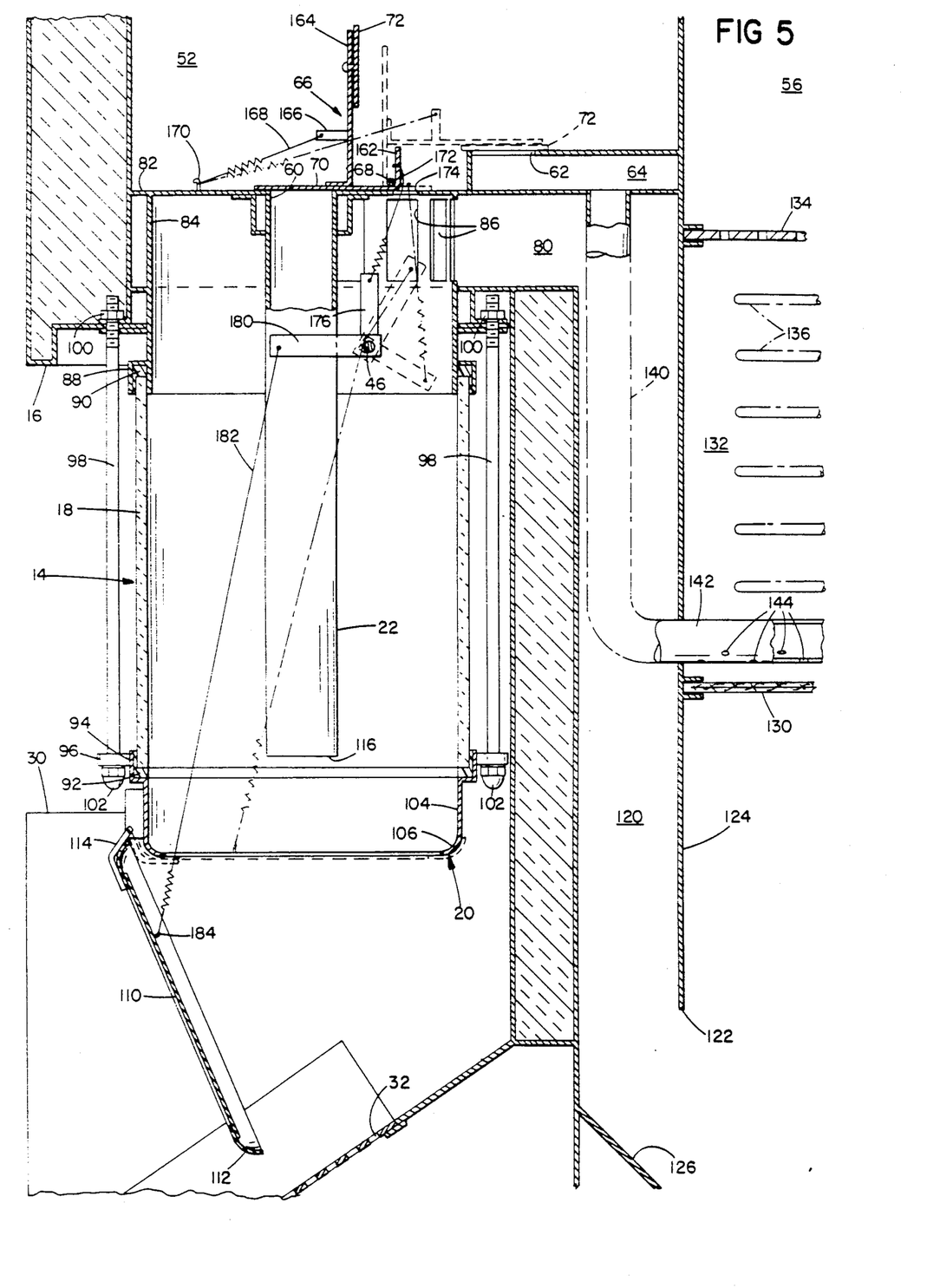
FIG. 5 is a view of the coffee roasting chamber of the coffee roaster shown in FIG. 1 with the roasting chamber open and the control valve array in bypass position.

Stainless steel roasting pan assembly 20 includes a cylindrical body member 104 that has a depth of about 2½ inches and an inner diameter of 9½ inches with a transition surface 106 (of about one inch radius) at its lower end. The pan assembly 20 is closed by planar base plate 110 that has a margin seal member 112 (FIG. 5) around its periphery which seats against the outer surface of the pan body 104 in closed position, and is supported by hinge assembly 114 for pivoting movement between a closed position as shown in FIG. 4 and an open position as shown in FIG. 5. In the closed position, pan base 110 is spaced three inches below the lower end 116 of jet tube 22.

A stainless steel lined channel for air exhausted from roasting chamber 14 extends from ports 86 through exhaust chamber 80, down vertical passage 120 past the lower end 122 of vertical barrier 124 to deflector 126 and then upwardly through lint screen 130 that forms the lower boundary of heater compartment 132, through compartment 132 and perforated cover plate 134 into fan chamber 56 for recirculation by fan 58 into supply plenum 52. As the air direction changes around barrier 124, chaff carried by the exhausted air stream is released for deposit in chaff collection region 135. Smaller entrained particles are blocked by and deposited on screen 130. An array of twelve heating elements 136 (each of one KVA capacity) are disposed in heating compartment 132 and are controlled at control panel 28 to establish the desired temperature of the fluidizing and roasting gas. Slot 138, at the rear base of heating compartment 132, provides an interconnection between the heating air circulation path and exhaust fan 152 in the cooling air circuit.

Two conduits 140 extend downwardly from the base of auxiliary plenum 64 and through barrier 124 into heater chamber 132. Each conduit 140 terminates in a horizontally disposed pipe 142 that has an array of discharge orifices 144 directed generally downwardly toward screen 130.

The cooling portion of the roaster 10 includes region 30 with chamber 150 below that region that is bounded in part on its upper side by support 32 of the cooling region. Mounted at the rear of the roaster unit below heater chamber 132 is exhaust fan 152 that is driven one third horsepower motor 154. The inlet 156 of fan 152 is in communication with chamber 150 through a passage 158 that extends by the chaff collection area 134; and air from fan 152 is exhausted through outlet 160 to scrubber 36.

Further details of the roasting chamber 14 and the mode control valve assembly 66 may be had with reference to FIG. 5. Valve assembly 66 has a first position in which port 62 is open and valve plate 70 closes chamber port 60 (as indicated in FIG. 5) and a second position in which port 60 is open and valve member 72 closes auxiliary plenum port 62 (as indicated in the dotted line position shown in FIG. 5). That valve assembly includes a valve plate 70 that is mounted for rotation about valve shaft 68 and that has a tab member 162 upstanding from plate 70. Mounted on plate 70 is support 164 to which valve member 72 is secured. A tab 166 extending from support 164 is attached to one end of biasing link 168 with the other end of link 168 being secured to post 170 at the base of the plenum chamber 52. An operating link 172 is secured to tab 162 and extends through a hole 174 in plenum divider plate 82 and is attached to arm 176 that is secured for rotation with operating shaft 46. In the valve position shown in FIG. 5, biasing link 168 seats valve plate 70 against port 60 to close that port. When shaft 46 is rotated clockwise 120 degrees, arm 176 pulls biasing link 172 to the dotted line position, which rotates the valve assembly to the dotted line position in which valve member 72 seats on and closes port 62 of the auxiliary plenum while opening port 60 to jet tube 22. Thus, in the solid line position shown in FIG. 5, valve 66 is in the bypass mode, roasting chamber port 60 is closed, and air flows from supply plenum 52 through port 62 into auxiliary chamber 64. In the second (dotted line) valve position, auxiliary plenum port 62 is closed and roasting chamber port 60 is open.

Also secured to shaft 46 is a second arm 180 to which is connected biasing link 182 with its other end attached at point 184 to pan plate 110. Rotation of shaft 46 moves arm 180 between the position shown in FIG. 5 in which the roasting chamber is open and the contents of the chamber are transferred to the cooling region 30, and a second position in which link 182 pivots plate 110 upwardly to close the chamber.

Figure 6:
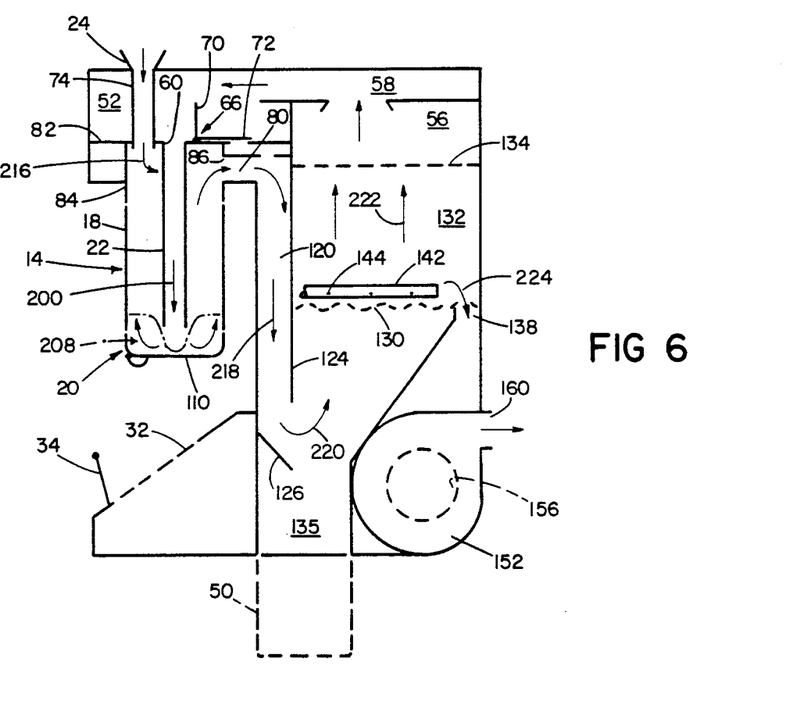
FIG. 6 is a diagrammatic view showing air flow paths in the roasting mode of operation of the apparatus shown in FIG. 1.
Figure 7:
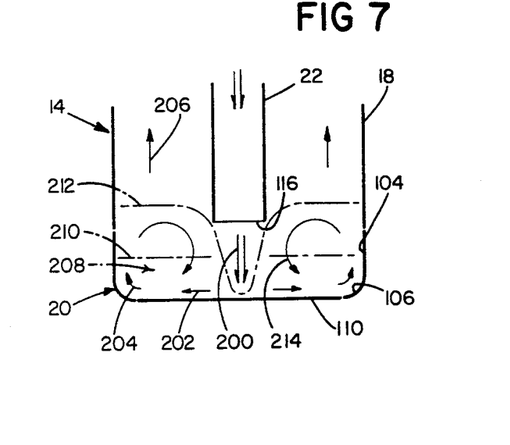
FIG. 7 is a diagrammatic view illustrating aspects of coffee bean roasting.

Thus, rotation of shaft 46 provides coordinated movement of the valve assembly 66 and chamber base 110. In a first shaft position (shown in FIG. 6 and in dotted position in FIG. 5), roasting chamber 14 is closed and heated air propelled by fan 58 is flowed from plenum 52 downwardly through tube 22 with a velocity of about eight to ten thousand feet per minute as indicated by arrows 200. With reference to the diagram of FIG. 7, the downward high velocity column of air 200 impacts base 20 and is uniformly deflected outwardly in radial directions as indicated by arrows 202 and then deflected upwardly by the smoothly radiused peripheral margin 106 as indicated by arrows 204. The air then flows upwardly through the chamber as indicated by arrows 206. This gas flow fluidizes the charge 208 of green coffee beans in the chamber and increases its height from an initial (nonfluidized) level 210 to a level 212 above the discharge port 116 of tube 22, the fluidized coffee beans 208 flowing in a todorial recirculation pattern as indicated by arrows 214.

The upper portion of chamber 14 is at a slight negative pressure with respect to the atmosphere, and the upwardly flowing gas (arrows 206) carries chaff released from the beans 208 during the roasting process and is diluted with ambient air drawn in through tube 74 (as indicated by arrow 216) to reduce the gas temperature. The diluted air stream flows through exhaust ports 86 and down passage 120 (indicated by arrow 218), around vertical barrier 124 as indicated by arrows 220 (FIG. 6) for upward flow through screen 130 into heater compartment 132 and return into fan chamber 56 as indicated by arrows 222. Chaff entrained in the air stream is released as the air flow direction turns upward (arrow 220) and is deposited in collection region 135 with smaller entrained particles being blocked by lint screen 130. A fraction of the air stream flowing into heater compartment 132 is drawn off through slot 138 by fan 152 as indicated by arrow 224 and the remainder is reheated to the selected roasting gas temperature and flowed into fan chamber 52 for recirculation.

Figure 8:
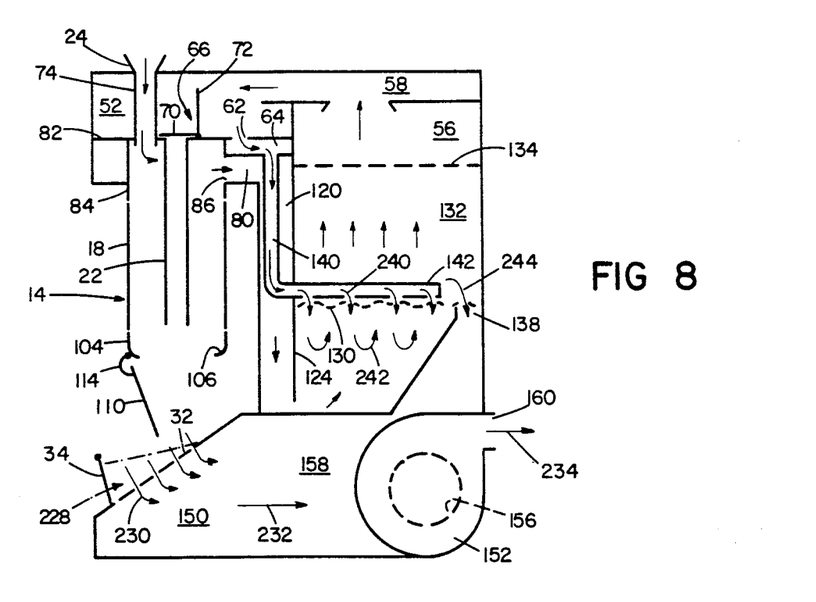
FIG. 8 is a diagrammatic view showing air flow paths in the bypass and cooling modes of operation of the apparatus shown in FIG. 1.

In a second position of shaft 46, valve 66 is shifted to a bypass mode (shown in solid line in FIG. 5) and the base 20 of chamber 14 is opened (as indicated in solid lines in FIG. 5 and in FIG. 8). The charge of roasted coffee beans is transferred to the cooling zone 30 defined by plate 32 and gate 34. Cooling air is drawn through the roasted coffee beans 228 and surface 32 as indicated by arrows 230 for flow rearwardly past chaff collection region 134 as indicated by arrow 232 and exhaust by fan 152 through port 158 (as indicated by arrow 234) to scrubber unit 36.

The air flow path in the heating circuit in this mode is as indicated in FIG. 8. In that flow path, air flowed by fan 58 into plenum 52 is exhausted through port 62 as indicated by arrow 238 and flows through tubes 140 for discharge through ports 144 in an array of downwardly directed jets 240 that impact on lint screen 130 and release particles adhered thereto, the air then being flowed upwardly at lower velocity through the heater compartment as indicated by arrows 242 for return to the fan compartment 56 with a minor fraction again being diverted to the cooling air flow path as indicated by arrow 244.

In a particular roasting sequence, air is heated to a temperature of about 580° F. in the heater compartment 132 and fan 58 circulates that air at a rate of about 200 cubic feet per minute (producing a pressure in supply plenum of about five inches of water) with a resulting velocity of about ten thousand feet per minute of jet column 200. A one pound charge of green coffee beans is roasted in about one and one-half minutes and then the roasted charge is transferred to the cooling zone by operation of handle 44 which rotates shaft 46 to open chamber 14 and release the beans for flow into the cooling zone 30 with concurrent diverting of the roasting gas stream to the auxiliary plenum 64.

The flow of cooling air produced by fan 152 draws the vapors from the roasted coffee and from the roasting chamber downwardly through support 32 for exhaust by fan 152 into the scrubber unit 36. Concurrently valve 66 is moved to the bypass mode and recirculating air is directed through port 62 of auxiliary plenum 64 and produces downwardly directed jets as indicated by arrows 240 for dislodging particulate material from screen 130. The dislodged material is deposited in the collection region 135 with the air being flowed upwardly at low velocity through heater chamber 132 for recirculation through the fan compartment 56.

While a particular embodiment of the invention has been shown and described, various modifications will be apparent to those skilled in the art. For example, control arrangements other than valve 66 may be used, charges of beans may be loaded into and removed from roasting chamber 14 in other ways, operating parameters of the roaster may be varied as by sequencing of fans 54 and 156 and/or by adjusting air flows during the roasting and cooling sequence. Therefore it is not intended that the invention be limited to the disclosed embodiment or to details thereof, and departures may be made therefrom within the spirit and scope of the invention.

What is claimed is:

1. Coffee bean roasting apparatus comprising
a supply plenum,
a roasting chamber depending from said supply plenum, said roasting chamber including a cylindrical wall and a planar base in fixed relation to said cylindrical wall,
a single inlet tube coaxially disposed in said chamber and extending downwardly from said supply plenum, and an outlet port adjacent the top of said roasting chamber,
means for flowing fluid through said supply plenum exclusively into said tube for discharge as a high velocity column against said planar base and deflection radially outward for upward flow at lower velocity and exhaust through said outlet port, said high velocity column of fluid producing fluidization and toroidal recirculation of a charge of coffee beans in said chamber, and
heater means for heating said fluid to a predetermined coffee bean roasting temperature whereby heat is transferred to the coffee beans in said chamber by thermal convection from said high velocity column and by conduction between individual coffee beans to provide uniform roasting of said coffee beans.

2. The apparatus of claim 1 wherein said chamber has a diameter that is three to six times the diameter of said central tube.

3. The apparatus of claim 1 wherein the discharge port of said tube is spaced one to three times its diameter above the planar surface of said base.

4. The apparatus of claim 1 wherein said chamber has a transition between said cylindrical wall and said planar base in the form of a smoothly curved continuous surface that has a radius of at least about one inch.

5. The apparatus of claim 1 and further including a cooling zone adjacent said roasting chamber, and means for transferring the roasted beans into said cooling zone as soon as roasting has been completed.

6. The apparatus of claim 5 wherein said cooling zone includes a foraminous support surface for said beans, and further including means for flowing ambient air through said foraminous support surface for cooling said roasted coffee beans.

7. The apparatus of claim 1 wherein the coffee bean capacity of said roasting chamber is less than five pounds.

8. Coffee bean roasting apparatus comprising
a supply plenum,
a roasting chamber depending from said supply plenum, said roasting chamber including a cylindrical wall and a planar base in fixed relation to said cylindrical wall,
an inlet tube coaxially disposed in said chamber and extending downwardly from said supply plenum, and an outlet port adjacent the top of said roasting chamber,
blower means for flowing fluid through said supply plenum into said tube for discharge as a high velocity column against said planar base and deflection radially outward for upward flow at lower velocity and exhaust through said outlet port, said high velocity column of fluid producing fluidization and toroidal recirculation of a charge of coffee beans in said chamber,
heater means for heating said fluid to a predetermined coffee bean roasting temperature whereby heat is transferred to the coffee beans in said chamber by thermal convection from said high velocity column and by conduction between individual coffee beans to provide uniform roasting of said coffee beans,
structure defining a fluid flow path external of said chamber, said flow path interconnecting said chamber outlet port and said inlet tube and said heater means being coupled to said flow path defining structure,
structure defining a chaff collection region coupled to said flow path defining structure between said chamber outlet port and said heater means, and
means coupled to said flow path defining structure for introducing dilution fluid to reduce the temperature of the fluid exhausted from said roasting chamber through said exhaust port so that the temperature of the chaff transported from said roasting chamber to said chaff collection region does not reach its autoignition temperature.

9. The apparatus of claim 8 wherein said dilution fluid introducing means includes a port for loading a charge of coffee beans into said roasting chamber.

10. Coffee bean roasting apparatus comprising
a supply plenum,
a roasting chamber depending from said supply plenum, said roasting chamber including a cylindrical wall and a planar base in fixed relation to said cylindrical wall,
an inlet tube coaxially disposed in said chamber and extending downwardly from said supply plenum, and an outlet port adjacent the top of said roasting chamber,
blower means for flowing fluid through said supply plenum into said tube for discharge as a high velocity column against said planar base and deflection radially outward for upward flow at lower velocity and exhaust through said outlet port, said high velocity column of fluid producing fluidization and toroidal recirculation of a charge of coffee beans in said chamber,
heater means for heating said fluid to a predetermined coffee bean roasting temperature whereby heat is transferred to the coffee beans in said chamber by thermal convection from said high velocity column and by conduction between individual coffee beans to provide uniform roasting of said coffee beans, structure defining a fluid flow path external of said chamber, said flow path interconnecting said chamber outlet port and said inlet tube and said heater means being coupled to said flow path defining structure, a bypass circuit coupled to said flow path defining structure for providing an auxiliary path bypassing said roasting chamber, valve structure having a first mode connecting said roasting chamber in said flow path and a second mode connecting said auxiliary flow path in said flow path, and means for placing said valve structure in said second mode during transfer of a charge of roasting coffee beans from said roasting chamber so that flow of fluid through said heater means is maintained during that interval.

11. The apparatus of claim 10 wherein said heater means includes an array of electrical heater elements disposed in a heater compartment coupled to said flow path.

12. The apparatus of claim 11 and further including
lint screen structure disposed in said flow path between the outlet of said roasting chamber and said heater means, and nozzle structure connected to said auxiliary path for flowing high velocity streams of fluid in reverse direction through said lint screen structure to dislodge lint from said screen while said valve structure is in said second mode.

13. Coffee bean roasting apparatus comprising
a supply plenum, a roasting chamber depending from said supply plenum, said roasting chamber including a cylindrical wall and a planar base in fixed relation to said cylindrical wall, an inlet tube coaxially disposed in said chamber and extending downwardly from said supply plenum, and an outlet port adjacent the top of said roasting chamber.

blower means for flowing fluid through said supply plenum into said tube for discharge as a high velocity column against said planar base and deflection radially outward for upward flow at lower velocity and exhaust through said outlet port, said high velocity column of fluid producing fluidization and toroidal recirculation of a charge of coffee beans in said chamber, heater means for heating said fluid to a predetermined coffee bean roasting temperature whereby heat is transferred to the coffee beans in said chamber by thermal convection from said high velocity column and by conduction between individual coffee beans to provide uniform roasting of said coffee beans, structure defining a fluid flow path external of said chamber, said flow path interconnecting said chamber outlet port and said inlet tube and said heater means being coupled to said flow path defining structure, a bypass circuit coupled to said flow path defining structure for providing an auxiliary path bypassing said roasting chamber, valve structure having a first mode connecting said roasting chamber in said flow path and a second mode connecting said auxiliary flow path in said flow path, lint screen structure disposed in said flow path between the outlet of said roasting chamber and said heater means, and nozzle structure connected to said auxiliary path for flowing high velocity streams of fluid in reverse direction through said lint screen structure to dislodge lint from said screen while said valve structure is in said second mode.

14. Apparatus for roasting coffee beans and the like comprising
a roasting chamber for receiving a charge of coffee beans to be roasted, said chamber including an inlet port and an outlet port, structure defining a fluid flow path external of said chamber, said flow path interconnecting said chamber outlet and inlet ports, means for flowing fluid through said flow path and said roasting chamber for fluidizing a charge of coffee beans in said chamber, heater means in said flow path defining structure for heating said fluid to a predetermined coffee bean roasting temperature whereby heat is transferred to the fluidized coffee beans in said chamber by said heated recirculating fluid to roast said coffee beans, structure defining a chaff collection region coupled to said flow path defining structure between said chamber outlet port and said heater means, and means coupled to said flow path defining structure for introducing dilution fluid to reduce the temperature of the fluid exhausted from said roasting chamber through said exhaust port so that the temperature of the chaff transported from said roasting chamber to said chaff collection region does not reach its autoignition temperature.

15. The apparatus of claim 14 wherein said dilution fluid introducing means includes a port for loading a charge of coffee beans into said roasting chamber.

16. The apparatus of claim 14 and further including
a bypass circuit coupled to said flow path defining structure for providing an auxiliary path bypassing said roasting chamber, valve structure having a first mode connecting said roasting chamber in said flow path and a second mode connecting said auxiliary flow path in said flow path, and means for placing said valve structure in said second mode during transfer of a roasted charge of coffee beans from said roasting chamber so that flow of fluid through said heater means is maintained during that interval.

17. The apparatus of claim 16 wherein said heater means includes an array of electrical heater elements disposed in a heater compartment coupled to said flow path.

18. The apparatus of claim 16 and further including
lint screen structure disposed in said flow path between the outlet of said roasting chamber and said heater means, and nozzle structure connected to said auxiliary path for flowing high velocity streams of fluid in reverse direction through said lint screen structure to dislodge lint from said screen while said valve structure is in said second mode.

19. The apparatus of claim 18 wherein said lint screen and said nozzle structure are located relative to said chaff collection region so that lint dislodged from said screen structure is deposited in said chaff collection region.

20. The apparatus of claim 14 and further including structure defining a cooling zone adjacent said roasting chamber, and
second means for flowing fluid along a second flow path through said cooling zone for cooling a charge of roasted coffee beans transferred from said roasting chamber to said cooling zone.

21. The apparatus of claim 20 and further including port structure interconnecting said first and second flow paths for transferring a fraction of the fluid flowing in one of said flow paths to the other flow path.

22. The apparatus of claim 15 and further including dump port structure in said roasting chamber,
means coordinating the operation of said dump port structure and said valve structure for placing said valve structure in said second mode when said dump port structure is open 23. The apparatus of claim 22 and further including structure defining a cooling zone below said roasting chamber,
second means for flowing fluid along a second flow path through said cooling zone for cooling a charge of roasted coffee beans transferred from said roasting chamber to said cooling zone, and
port structure interconnecting said first and second flow paths for transferring a fraction of the fluid flowing in said first flow path to said second flow path.

24. Apparatus for roasting coffee beans and the like comprising
a roasting chamber for receiving a charge of coffee beans to be roasted, said chamber including an inlet port and an outlet port,
structure defining a fluid flow path external of said chamber, said flow path interconnecting said chamber outlet and inlet ports,
means for flowing fluid through said flow path and said roasting chamber for fluidizing a charge of coffee beans in said chamber,
heater means in said flow path defining structure for heating said fluid to a predetermined coffee bean roasting temperature whereby heat is transferred to the fluidized coffee beans in said chamber by said heated recirculating fluid to roast said coffee beans,
a bypass circuit coupled to said flow path defining structure for providing an auxiliary path bypassing said roasting chamber,
valve structure having a first mode connecting said roasting chamber in said flow path and a second mode connecting said auxiliary flow path in said flow path,
means for placing said valve structure in said second mode during transfer of a roasted charge of coffee beans from said roasting chamber so that flow of fluid through said heater means is maintained during that interval.

25. Apparatus for roasting coffee beans and the like comprising
a roasting chamber for receiving a charge of coffee beans to be roasted, said chamber including an inlet port and an outlet port,
structure defining a fluid flow path external of said chamber, said flow path interconnecting said chamber outlet and inlet ports,
lint screen structure disposed in said flow path between the outlet of said roasting chamber and said heater means,
a bypass circuit coupled to said flow path defining structure for providing an auxiliary path bypassing said roasting chamber,
valve structure having a first mode connecting said roasting chamber in said flow path and a second mode connecting said auxiliary path in said flow path,
means for flowing fluid through said flow path and said roasting chamber for fluidizing a charge of coffee beans in said chamber,
heater means in said flow path defining structure for heating said fluid to a predetermined coffee bean roasting temperature whereby heat is transferred to the fluidized coffee beans in said chamber by said heated recirculating fluid to roast said coffee beans, and
nozzle structure connected to said auxiliary path for flowing high velocity streams of fluid in reverse direction through said lint screen structure to dislodge lint from said screen while said valve structure is in said second mode.

26. The apparatus of any one of claims 14, 24 or 25 and further including
structure coupled to said flow path defining a supply plenum, and wherein
said roasting chamber depends from said supply plenum and includes a cylindrical wall, a planar base in fixed relation to said cylindrical wall, and an inlet tube coaxially disposed in said chamber and extending downwardly from said supply plenum, and said outlet port is adjacent the top of said roasting chamber,
and wherein said fluid flowing means flows fluid from said supply plenum into said tube for discharge as a high velocity column against said planar base and deflection radially outward for upward flow at lower velocity and exhaust through said outlet port, said high velocity column of fluid producing fluidization and toroidal recirculation of a charge of coffee beans in said chamber.

27. The apparatus of claim 26 wherein wherein the coffee bean capacity of said roasting chamber is less than five pounds, said chamber has a diameter that is about three to six times the diameter of said inlet tube, the discharge port of said tube is spaced about one to three times its diameter above the planar surface of said base, and said chamber has a transition between said cylindrical wall and said planar base in the form of a smoothly curved continuous surface that has a radius of at least about one inch.

* * * * *